Nov. 4, 1924.
G. F. RUFFING
BEEF SKINNING MACHINE
Filed Dec. 8, 1923 2 Sheets-Sheet 1
1,514,104
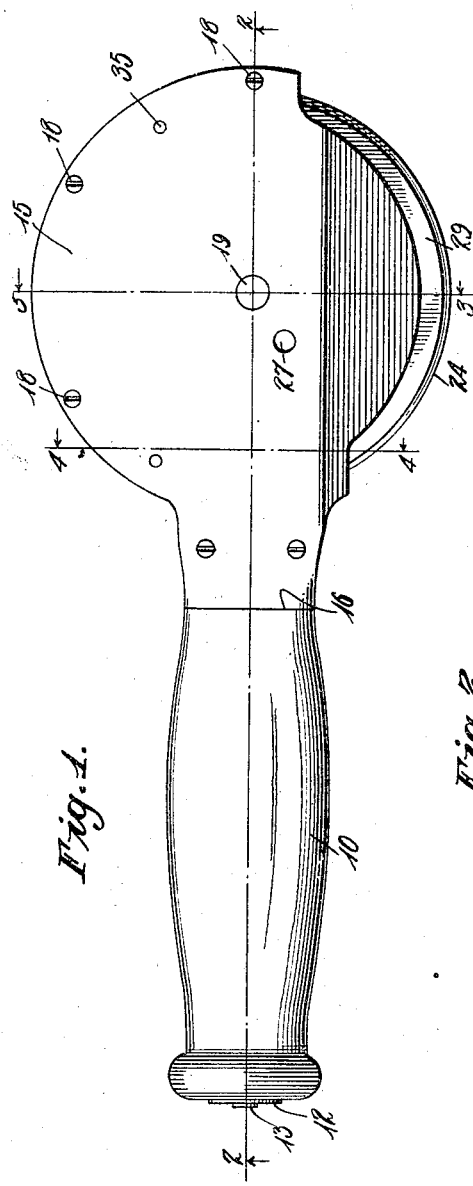
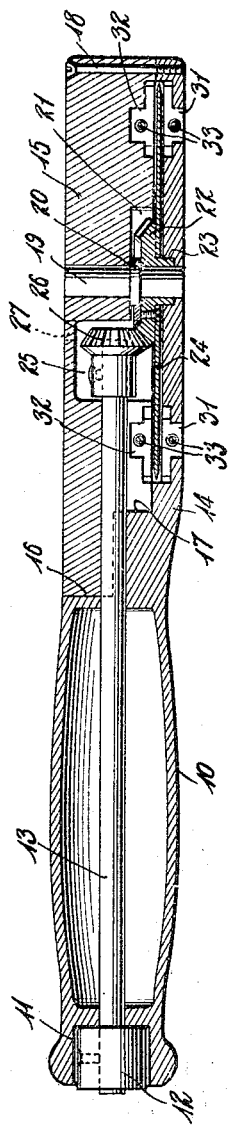
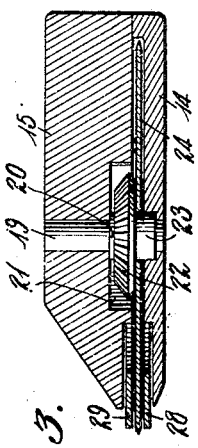
Inventor
George F. Ruffing
By Knight Bros.
Attorneys Nov. 4, 1924.

G. F. RUFFING

BEEF SKINNING MACHINE

Filed Dec. 8, 1923

Inventor
George F. Ruffing
By Knight Bros.
Attorneys

Patented Nov. 4, 1924.

1,514,104

UNITED STATES PATENT OFFICE.

GEORGE FRANCIS RUFFING, OF McKEESPORT, PENNSYLVANIA.

BEEF-SKINNING MACHINE.

Application filed December 8, 1923. Serial No. 679,357.

*To all whom it may concern:*

Be it known that I, GEORGE FRANCIS RUFFING, a citizen of the United States, and a resident of McKeesport, in the county of Allegheny and State of Pennsylvania, have invented certain new and useful Improvements in a Beef-Skinning Machine, of which the following is a specification.

This invention relates to beef skinning machines and has for its particular object to provide a compactly arranged cutting device which may be conveniently inserted between the body and hide of the carcass to cut the hide therefrom.

Another object of the invention is to provide a device of this type having adjustable guards whereby the depth of the cut may be regulated.

The invention further consists in the novel combination, construction and arrangement of parts as will be more fully hereinafter set forth in the following specification, especially when considered in connection with the accompanying drawings, wherein:

Fig. 1 is a side elevation of the beef skinning machine,

Fig. 2 is a longitudinal section taken on the plane indicated by line 2—2 in Fig. 1, Fig. 3 is a transverse sectional view taken on the plane indicated by line 3—3 in Fig. 1, Fig. 4 is a similar view taken on the plane indicated by line 4—4 in Fig. 1, Fig. 5 is a side elevation of the machine, a certain part being removed.

Figure 5:
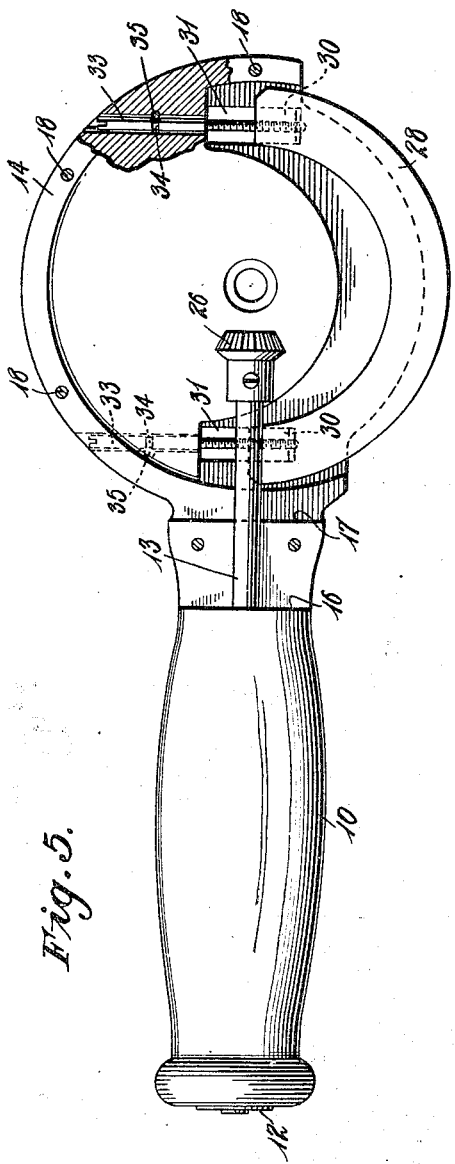

Referring now more particularly to the drawings wherein like reference characters indicate like parts it will be noted that the invention consists essentially of a hollow handle 10 recessed at its outer end as at 11 for the reception of a bearing collar 12 which surrounds the power shaft 13. Power is transmitted to the shaft 13 in any suitable manner preferably by means of a flexible shaft from the source of power.

Formed integrally with the handle 10 is one section 14 of the housing which encloses the operating parts of the device. The other section of the housing is indicated by the reference character 15. The housing sections 14 and 15 are substantially circular in plan view, the housing section 15 engaging the handle portion 10 at the point indicated by the reference character 16. The housing sections 14 and 15 are further shouldered as at 17, the two pair of abutting faces formed on the housing sections 14 and 15 and indicated by the reference characters 16 and 17 assisting in preventing a relative displacement of the housing sections as will appear more fully hereinafter. Cooperating to secure the housing section 15 to the section 14 are a plurality of bolts 18 arranged around a periphery of the housing sections in the manner clearly illustrated in Figs. 1 and 2.

Fixed rigidly in the housing section 15 and projecting through the housing section 14 is a stub shaft 19 having formed thereon a collar 20 which bears against the bottom of a recess 21 formed on the inner face of the housing section 15.

Journally mounted on the stub shaft 19 is a bevel pinion 22 formed with a hub flange 23 which rotates in a recess formed in the housing 14. The bevel pinion 22 reposes in the recess 21 of the housing 15. Fixed to the bevel pinion 22 is a cutting disc or knife 24, this disc being mounted so as to project out of the casing for a purpose to be later referred to.

The end of the shaft 13 projects into a recess 25 formed in the housing 15 and has affixed thereto a bevel pinion 26 adapted to mesh with the bevel pinion 22 for the purpose of rotating the cutting disc 24. In this manner when power is applied to the shaft 13 the bevel pinion 22 will be rotated about the stub shaft 19 and the cutting disc affixed thereto will consequently also be rotated. Displacement of the bevel pinion 22 relative to the stub shaft 19 is prevented on one hand by reason of the collar 20 and on the other hand by reason of the housing section 14. An aperture 27 formed in the housing section 15 communicates with the recess 25 whereby lubricant may be supplied to the interior of the housing for lubricating the working parts. This opening may be closed in any suitable manner.

Figure 6:
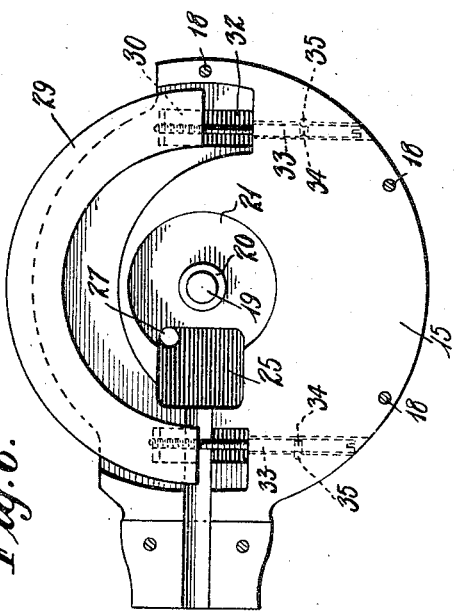
Fig. 6 is an elevation of the part removed from Fig. 5.
Figure 7:
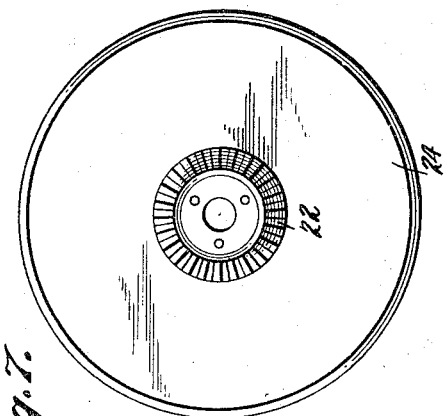
Fig. 7 is an elevation of the cutting disc.

For the purpose of regulating the depth of the cut there is provided a pair of guards 28 and 29 carried respectively by the housing sections 14 and 15. These guards consist of substantial semi-circular strips as clearly illustrated in Figs. 5 and 6. Enlargements 30 formed on the ends of the guard strips 28 and 29 repose in slots 31 formed in the housing 14 and in recesses 32 formed in the housing section 15 respectively. The slots and recesses are substantially elongated in the direction in which it is desired to move the guards so that the guards may be adjusted. For the purpose of adjusting the guards and maintaining them in their adjusted position there is provided operating or set screws 33 which screw threadedly engage the enlargements 30 formed on the ends of the guard strips. These set screws pass loosely through openings formed in the housing sections 14 and 15 respectively. These operating screws 33 are each formed with a circular groove 34 with which engages a transversely arranged pin 35 whereupon axial displacement of the operating screws is prevented. It will therefore be seen that when the operating screws 33 are rotated the guard plates 28 and 29 will be moved outwardly or inwardly with reference to the cutting disc 24. A pair of these set screws 33 are provided for each guard strip and the guard strips may therefore be operated independently so that the knife or cutting disc may be guarded more on one side should this be necessary. Furthermore the depth of the cut may be conveniently regulated by adjusting the guards radially with respect to the cutting disc.

In operation the cutting disc is set into motion, it being rotated at a relatively high rate of speed. The device is inserted between the carcass and the hide of the animal and the skin separated therefrom. It should be noted that the over all thickness of the device has been reduced to a minimum, so that the skinning of cattle and the like is facilitated. By making the device relatively thin it may be easily inserted between the hide and carcass as will be readily apparent.

Lubricant may be contained within the housing and hollow handle so as to make the device self lubricating. The set screws 33 are easily accessible from the periphery of the housing whereby the guards may be set so that the knife will cut to the desired depth. Obvious modifications may suggest themselves and to this end reservation is made to make such changes as may come within the purview of the accompanying claims.

Having thus described my invention, what I claim is:

1. In a beef skinning machine, a handle, a housing formed in sections, one section of said housing being formed integrally with said handle, a rotary cutting disc mounted in said housing, means contained in said housing for rotating said disc and adjustable guards mounted in said housing and projecting on both sides of said cutting discs.

2. In a beef skinning machine, a relatively narrow casing, said casing being formed in sections, a handle formed integrally with one section, a rotary cutting disc mounted within said casing, means mounted within said casing for rotating said disc, a pair of guards mounted in said casing and projecting on both sides of said knife and adjusting screws screw-threadedly engaging said guards for adjusting the same.

3. In a beef skinning machine of the class described, a relatively narrow casing formed in sections, a handle formed integrally with one section, an operating shaft extending through said handle and into said casing, a stub shaft carried rigidly by one of said housing sections, a bevel pinion mounted on said shaft, a cutting disc fixed to said pinion, a pinion on the end of said shaft meshing with said first mentioned pinion whereby said cutting disc may be rotated and guards carried by said casing sections and projecting on both sides of said cutting discs substantially as and for the purpose set forth.

4. In a beef skinning machine of the class described a relatively narrow casing formed in sections, a handle formed integrally with one of said sections, a power shaft extending therethrough and into said casing, a stub shaft projecting from one of said casing sections, a bevel pinion mounted on said stub shaft, a cutting disc fixed to said bevel pinion, a second bevel pinion connected with said power shaft and meshing with said first mentioned bevel pinion whereby said cutting disc may be rotated, a pair of semicircular shaped guards arranged on both sides of said cutting disc, enlargements formed on the ends of said guards, said screws screw threadedly engaging said enlargements and fixed against axial displacement in said casing sections, whereby said guards may be adjusted independently and relatively to said cutting disc.

GEORGE FRANCIS RUFFING.